G. SCHAULI.
ELECTRIC CELL.
APPLICATION FILED SEPT. 18, 1906.
902,173.
Patented Oct. 27, 1908.
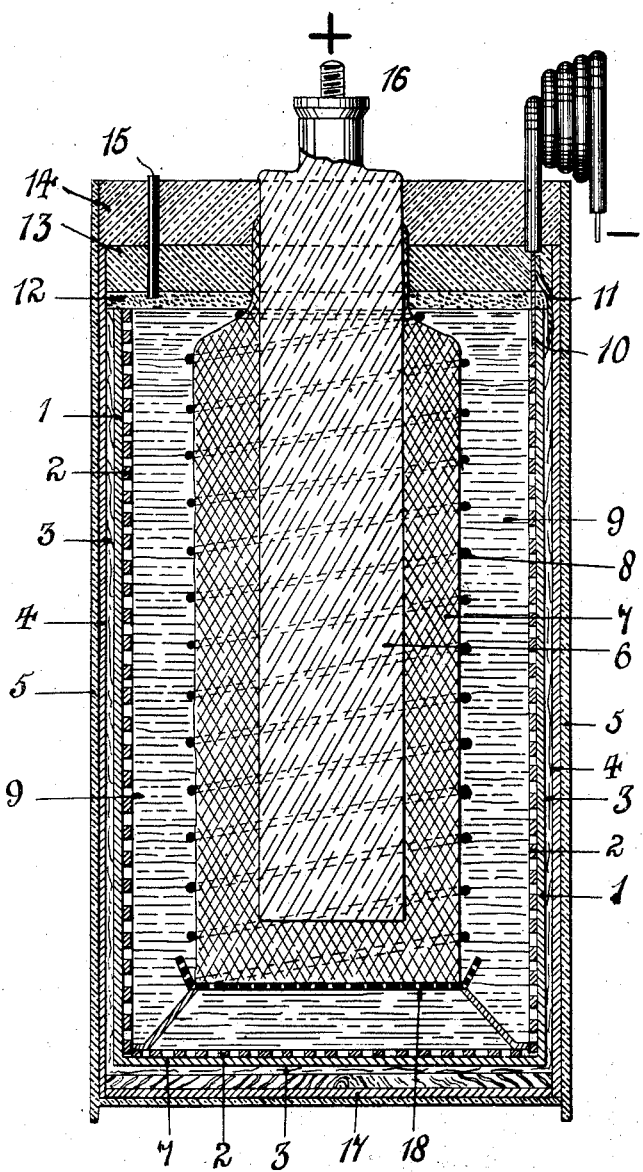

UNITED STATES PATENT OFFICE.

GEORGES SCHAULI, OF LONDON, ENGLAND.

ELECTRIC CELL.

No. 902,173.

Specification of Letters Patent.

Patented Oct. 27, 1908.

Application filed September 18, 1906. Serial No. 335,067.

*To all whom it may concern:*

Be it known that I, GEORGES SCHAULI, subject of the Emperor of Germany, residing at 175$^B$ Kentish Town road, London, England, have invented new and useful Improvements in Electric Cells, of which the following is a specification.

This invention relates to an improved construction of electric cell in which the destructible negative-pole electrode, consisting of a metal such as zinc has a laminated composition the components of which are so disposed relatively to the electrolyte that one or more layers are initially held in reserve, isolated from electro-chemical action, a reserve layer being adapted to automatically come into active operation when the electrolyte has effected the penetration of the isolating layer.

A further advantageous feature of this invention consists in the means for augmenting the area of initial electro-chemical action.

To obtain the above described effects I provide a liquid-tight vessel made of zinc or other metal suitable to act as the negative-pole electrode of an electric cell and to augment the area of activity of this electrode I give it a perforated lining composed of the same metal, which lining is maintained in close metallic contact with the interior surface of the said liquid-tight vessel. Within this cell is placed the positive pole electrode composed of suitable material for the purpose, as for example carbon, this electrode being surrounded by a suitable depolarizing agent and between the two electrodes is interposed a suitable electrolyte as for example ammonium-chlorid.

The electrolyte may contain inert substances mixed with the active electrolyte, adapted to form therewith a semi-solid substance and hold moisture in suspension causing the cell to be a so-called dry cell from which the moisture will not drain away by mere gravity.

To obtain a renewal of active life after chemical action has taken place to such a degree as to cause the formation of a hole in the vessel, through which liquid can exude, I surround the vessel with a layer of liquid absorbing material such as filter or blotting paper, which layer may have been saturated with the active agent of the electrolyte and afterwards dried, or alternatively this porous absorbent layer may be free from such electrolyte. Outside this porous layer I provide a second sheet of zinc or other metal like that of which the interior vessel is composed, and this may be succeeded by a further porous layer and a further sheet of the like metal, the whole being contained in a liquid-tight insulating case.

The interior vessel and the surrounding sheet or sheets of metal are, at or near their upper edges, electro-metallically united, and joined to the negative terminal of the cell.

A cell as above described, especially if it is a dry cell, is adapted to be recharged by a reversed electric current derived from a suitable source.

A convenient and advantageous form for the negative electrode vessel is that of a flat-ended cylinder.

On the accompanying drawing is a sectional elevation of a form of construction of an electric cell made in accordance with the above described invention in which a single reserve plate is provided.

In this drawing 1 is a liquid-tight vessel made of zinc or other metal suitable to operate as a negative-pole electrode. 2 is a perforated vessel made of the same metal, the exterior surface of which closely fits the interior surface of 1 and may be soldered thereto.

3 is an envelop which closely fits the exterior surface of 1, which envelop is composed of porous liquid-absorbing material, such as blotting or filter paper. The envelops of the vessel 1 is closely surrounded by a sleeve 4 composed of the same metal as 1. The whole is inclosed within a liquid-tight case 5 composed of insulating material.

The positive-pole electrode 6 is surrounded by a depolarizing substance 7 inclosed within a porous fabric 8 and the space between this latter and the surface of the perforated vessel contains the electrolyte 9 which may be intermixed with inert material forming a semi-solid mass adapted to hold the liquid electrolyte in suspension in a manner to prevent it from draining away under the action of gravity merely, and yet the force of capillary attraction, which will come into existence, when the vessel 1 has been penetrated by electro-chemical action, will cause the porous envelop 3 to become moistened by the liquid electrolyte. The negative-pole terminal is electro-metallically united to the vessel 1 and to the sleeve 5 at 10 and 11 respectively.

12 is a layer of inert particles such as finely divided glass through which any gases which may be generated in the cell will be able to find means of escape. On this is placed a layer of absorbent material 13 such as peat, or peat moss, and the cell is sealed by a layer of fusible substance 14 such as pitch and rubber or sulfur and tar, a vent pipe 15 having its lower end immersed in the layer 12 being provided to allow gases to escape and preclude the accumulation of pressure within the cell.

16 indicates a means of attachment of an electric lead to the positive pole electrode, 17 is a disk made of the same metal as 1, 2 and 4 and is a supplement to the sleeve 4, and 18 is an insulating carrier adapted to support the positive-pole electrode and depolarizing substance.

I claim.

1. An electric cell comprising a negative-pole electrode composed of metallic plates separated by an intervening layer of porous, liquid absorbing material in contact with the adjacent surfaces of both plates, the arrangement being such that the electrolyte comes initially into contact with one plate only but, on the penetration thereof by electro-chemical action, the electrolyte has access to the second plate at the portion of its surface adjacent to the place of penetration of the first.

2. An electric cell comprising a negative-pole electrode composed of metallic plates both of which are in metallic connection with the attachment for the return lead of the electric circuit to the cell, the plates being separated by an intervening layer of porous, liquid absorbing material in contact with the adjacent surfaces of both plates, the arrangement being such that the electrolyte comes initially into contact with one plate only but, on the penetration thereof by electro-chemical action, the electrolyte has access to the second plate at the portion of its surface adjacent to the place of penetration of the first.

3. An electric cell comprising a negative-pole electrode composed of metallic plates separated by an intervening layer of porous, liquid absorbing material impregnated with electrolytic re-agents in a dry and inert condition which porous layer is in contact with the adjacent surfaces of both plates, the arrangement being such that the electrolyte comes initially into contact with one plate only but, on the penetration thereof by electro-chemical action, the electrolyte has access to the second plate at the portion of its surface adjacent to the place of penetration of the first.

4. A form of construction of electrode for an electric cell in which the metallic plate, with which the electrolyte comes in contact, is a compound plate composed of a continuous fluid tight plate and a perforated plate in metallic contact therewith throughout the entire area of one surface of the perforated plates.

In testimony whereof I have signed my name to this specification in the presence of two subscribing witnesses.

GEORGES SCHAULI.

Witnesses:
H. D. JAMESON,
F. L. RANDS.